UNITED STATES PATENT OFFICE.

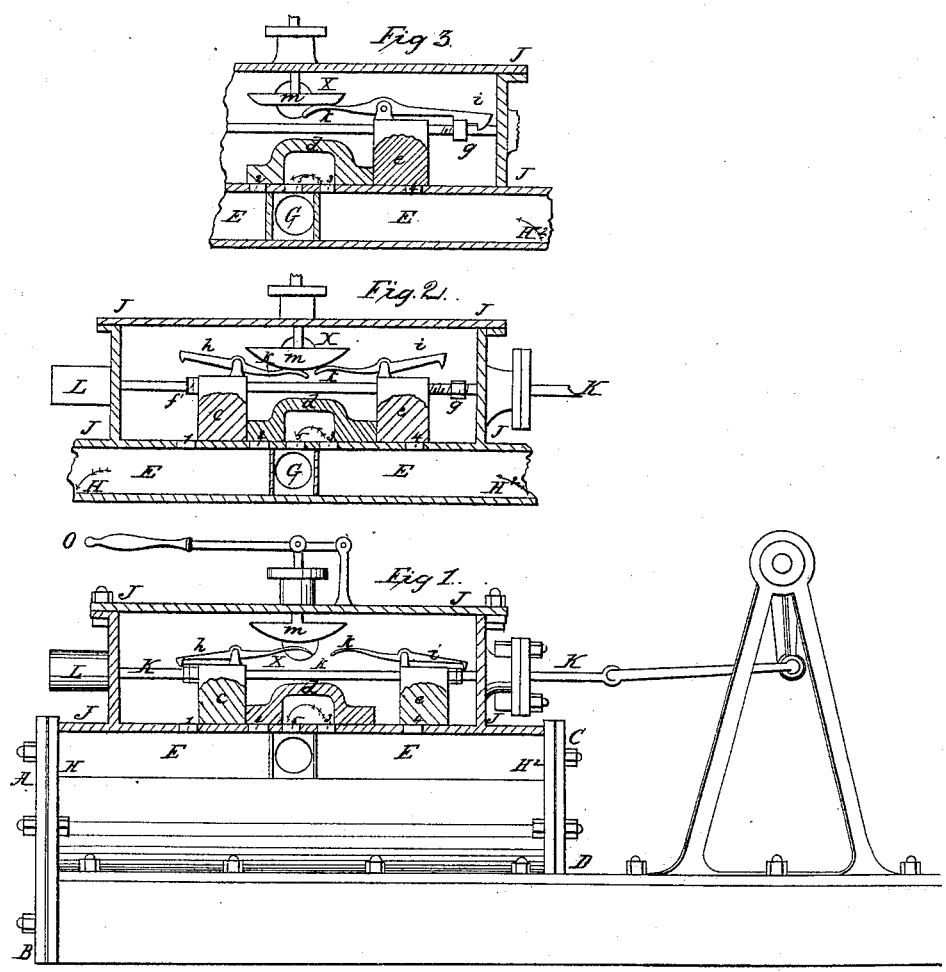

SIMON P. WINNE, OF ALBANY, NEW YORK.

SLIDING CUT-OFF VALVE.

Specification of Letters Patent No. 6,306, dated April 10, 1849.

*To all whom it may concern:*

Be it known that I, SIMON P. WINNE, of the city of Albany and State of New York, have invented a new and Improved Mode of Constructing the Steam Slides or valves of Steam-Engines so as to Cut Off the Supply of Steam at any Part of the Stroke of the Engine; and I declare the following specification with the drawings attached hereto and forming part of the same to be a full and accurate description.

Figure 1 represents a vertical longitudinal section of the steam chest and passages of a cylinder with the valves in their place and cut off ready to act. Fig. 2 represents the same with the cut off detached. Fig. 3 represents a part of the same with a treble cut off.

The same letters in both figures refer to same things.

A B C D represents a steam cylinder having on its top A C the usual hollow steam channel E E divided by partitions, to separate the entering from the spring steam in the usual manner, with the exit passage G and openings into the cylinder at H H. This steam chamber is surmounted by a steam chest J, J, J, J, in the usual form, but somewhat longer than is customary. The steam entering in by a passage X fills this chest from which there are four openings 1, 2, 3, 4 into the steam channel E E and one 5 into the exit passage, all properly faced for slides and arranged in reference to the valves to move over them, as shown in the drawings.

The valves three in number $c$, $d$, $e$ are of the kind known as slide valves $c$ and $e$ having solid bottom surfaces, and $d$ (the central valve) the usual chambered passage, to effect a communication alternately between two of the three central passages from the chest into the steam channel.

The valve rod K, K passes through a stuffing box at one end and has the other passed through a stuffing box, or passed into a projecting chamber L bored out to receive, support, and steady, its movement. The rod passes through the upper portions of the valves $c$ and $e$ which are pierced to receive it, but is not attached to them, moving freely through them. The rod, moved by eccentric or other customary arrangement of machinery communicates its motion to these valves by means of two stop-nuts $f$ and $g$ which screw upon a thread cut on the rod itself, for the purpose of adjusting the cut-off. Upon each of the valves $c$ and $e$ there is mounted a catch or detent $h$ and $i$ moving on a pivot with a handle or lever $k$, $k$, projecting in a direction opposite to the catch; the catch itself drops down upon the valve rod, taking hold of the stop nut at its end, so as to compel the valve to which it is attached, to obey the movements of the rod: it (the catch) is held in this position, either by its own weight or by a spring suitably attached thereto.

Directly over the center of the range passed over by the valves in their forward and backward movement, I place a metallic bar or plate $m$ having its lower edge slightly curved, or flat, or otherwise shaped as may prove most convenient in practice; placed, if it be an arc with its chord; if a flat, then its axis parallel with the valve rod. This bar or plate is attached to a spindle at right angles to it, which passes through a stuffing box on the top of the steam chest where it is attached to a convenient handle for raising and depressing it, by whose operation the detents $h$ and $i$ are attached and detached from their hold on the nuts $f$ and $g$. The valve $d$ lies upon its bed unattached to the rod, and is moved backward and forward by the impulse of $c$ and $e$ alternately, between which valves and $d$ there is to be left a space, to be determined by the portion of the stroke of the piston at which the steam is to be cut off.

The operation of the machine is as follows: As represented in Fig. 1, the valves are to be attached to the rod by the detents when the cut off is to be used. The engine is there represented as having just begun the stroke of its piston from left to right and the valve rod as beginning to move from right to left. Before the piston has passed (say) one-third of its stroke the valve $c$ will have covered the opening $r$ cutting off all passage of steam from the steam chest to the opening H in the cylinder and will keep it covered during the remaining portion of the stroke, during the course of which, valve $d$ kept stationary by the pressure of the superincumbent steam, passes steam from the right passage of the cylinder $H^2$ through passage 3 and 5 out by the exit passage G, until the valve $e$ in its progress touches it and impels it to the left when the passage 3 is closed by it and 2 and 5 put into communication with each other, and valve *c* carried over opening *r*. This completes the stroke and the engine reversing its motion, the same operation is repeated in reverse order from the right to the left: viz, *e* covers up passage 4 leaving *d* unmoved until *c* touches and shifts it to the same position now represented in Fig. 1. When it is desired to give full steam to the engine the lever O is to be depressed by which the detents *h* and *i* are raised. The consequence as may be seen from Fig. 2 will be to allow the three valves to act in contact and concert with each other operating as a single slide valve driven by a cam.

Figs. 1 and 2 represent the valves, detents, &c., as arranged to cut off the steam at some preconcerted portion of the stroke, which could not be altered without getting at the interior of the valve chamber and varying the distances of the stop nuts. By the plan represented in Fig. 3 the portion of the stroke at which the cut off is to be made can be regulated by the handle O. In that case the detents *h* and *i* instead of being each fitted with one jaw or hook, are shaped into two or more like steps (as delineated) in such manner that the one nearest the valve may hold it, (the valve) to the stop-nut at such place on the valve-rod, that it shall perform the shortest cut off desired in the habitual working of the engine,—the hook forming the end of the detent shall allow the rod to pass some distance before it catches and moves its valve, thus lengthening the cut off to the longest portion of the stroke desired—and the intermediate hooks by a similar operation, dividing up the cut off into subdivisions of the stroke between those recited. It is manifest from the drawing that by such an arrangement, it will only be necessary to depress the bar *m* so as to permit the proper tooth to drop down over the stop nuts, and the required cut off will be effected.

The valves when used with upright engines can be kept in their places by springs, during the absence of steam pressure.

I call my invention Winne's improved sliding cut off valve.

I claim—

The method of constructing and arranging sliding valves of steam engines, with their corresponding openings into steam passages, together with the regulating apparatus attached to said valves—so as to operate the cut off valves by the same rod which moves the eduction valves—also so as to permit the adjustment of the cut off valves in such manner as to close the steam passages at various preconcerted portions of the stroke, by hand gear during the operation of the engine; all in manner and form as set forth in the within specification and drawings.

SIMON P. WINNE.

Witnesses:
RUST VARICK DEWITT,
J. B. BRINSMADE, Jr.